United States Patent
Bunce et al.

(10) Patent No.: US 9,353,674 B2
(45) Date of Patent: May 31, 2016

(54) TURBULENT JET IGNITION PRE-CHAMBER COMBUSTION SYSTEM FOR SPARK IGNITION ENGINES

(71) Applicant: MAHLE Powertrain, LLC, Farmington Hills, MI (US)

(72) Inventors: Michael Bunce, Plymouth, MI (US); Hugh Blaxill, Novi, MI (US); William Attard, Brighton, MI (US)

(73) Assignee: MAHLE POWERTRAIN, LLC, Farmington Hills, MI (US)

( * ) Notice: Subject to any disclaimer, the term of this patent is extended or adjusted under 35 U.S.C. 154(b) by 0 days.

(21) Appl. No.: 14/496,824

(22) Filed: Sep. 25, 2014

(65) Prior Publication Data

US 2015/0068489 A1    Mar. 12, 2015

Related U.S. Application Data

(63) Continuation-in-part of application No. 13/286,638, filed on Nov. 1, 2011, now Pat. No. 8,857,405.

(60) Provisional application No. 61/408,892, filed on Nov. 1, 2010.

(51) Int. Cl.
| | |
|---|---|
| *F02B 19/00* | (2006.01) |
| *F02B 19/10* | (2006.01) |
| *F02B 19/12* | (2006.01) |
| *F02P 9/00* | (2006.01) |

(Continued)

(52) U.S. Cl.
CPC .......... *F02B 19/108* (2013.01); *F02B 19/1057* (2013.01); *F02B 19/12* (2013.01); *F02D 41/0027* (2013.01); *F02M 57/06* (2013.01); *F02P 5/04* (2013.01); *F02P 5/045* (2013.01); *F02P 9/007* (2013.01); *F02P 13/00* (2013.01); *Y02T 10/125* (2013.01)

(58) Field of Classification Search
CPC .......... F02B 19/00; F02B 19/10; F02B 19/12; F02B 19/1071
USPC .......... 123/261, 266, 267, 275, 293
See application file for complete search history.

(56) References Cited

U.S. PATENT DOCUMENTS

| | | | |
|---|---|---|---|
| 1,182,122 | A | 5/1916 | Eastman |
| 1,271,942 | A | 7/1918 | Ricardo |

(Continued)

FOREIGN PATENT DOCUMENTS

| | | |
|---|---|---|
| DE | 2 259 286 | 8/1973 |
| GB | 638162 | 5/1950 |

(Continued)

*Primary Examiner* — Thomas Moulis
(74) *Attorney, Agent, or Firm* — Howard & Howard Attorneys PLLC

(57) ABSTRACT

An ignition system for an internal combustion engine having at least one combustion chamber where the ignition system includes a housing, an ignition device, an injector, and a pre-chamber having a nozzle disposed spaced from the proximal portion of the pre-chamber. The igniter portion of the ignition device and the nozzle of the injector are operatively supported in the proximal portion of the pre-chamber and disposed flush therewith. The igniter portion ignites the fuel in pre-chamber such that partially combusted pre-chamber products are forced through orifices in the pre-chamber nozzle and extinguish, but dispersed through the combustion chamber so as to ignite the main fuel charge therein.

6 Claims, 12 Drawing Sheets

(51) Int. Cl.
*F02P 13/00* (2006.01)
*F02D 41/00* (2006.01)
*F02M 57/06* (2006.01)
*F02P 5/04* (2006.01)

(56) References Cited

U.S. PATENT DOCUMENTS

| | | | |
|---|---|---|---|
| 1,568,638 A | 7/1926 | Summers | |
| 2,121,920 A | 6/1938 | Mallory | |
| 2,422,610 A | 6/1947 | Bagnulo | |
| 2,615,437 A | 10/1952 | Broderson | |
| 2,690,741 A | 10/1954 | Broderson | |
| 2,884,913 A | 5/1959 | Heintz | |
| 3,092,088 A | 6/1963 | Goosak et al. | |
| 3,102,521 A | 9/1963 | Slemmons | |
| 3,230,939 A | 1/1966 | Goossak | |
| 3,283,751 A | 11/1966 | Goossak et al. | |
| 3,802,827 A | 4/1974 | Semenov et al. | |
| 4,077,366 A | 3/1978 | Hideg et al. | |
| 4,077,368 A | 3/1978 | Abthoff et al. | |
| 4,106,448 A * | 8/1978 | Noguchi | F02B 1/06 123/198 F |
| 4,108,136 A | 8/1978 | Hideg et al. | |
| 4,124,000 A | 11/1978 | Genslak | |
| 4,218,992 A | 8/1980 | Latsch et al. | |
| 4,239,023 A | 12/1980 | Simko | |
| 4,259,932 A | 4/1981 | Hideg et al. | |
| 4,270,499 A | 6/1981 | Frelund | |
| 4,301,825 A | 11/1981 | Simko | |
| 4,320,727 A | 3/1982 | Artman | |
| 4,416,228 A | 11/1983 | Benedikt et al. | |
| 4,442,807 A | 4/1984 | Latsch et al. | |
| 4,712,525 A * | 12/1987 | Ishida | F02B 19/12 123/145 A |
| 4,892,070 A | 1/1990 | Kuhnert | |
| 4,924,828 A | 5/1990 | Oppenheim | |
| 4,926,818 A | 5/1990 | Oppenheim et al. | |
| 4,974,571 A | 12/1990 | Oppenheim et al. | |
| 4,977,873 A | 12/1990 | Cherry et al. | |
| 5,050,550 A | 9/1991 | Gao | |
| 5,085,189 A | 2/1992 | Huang et al. | |
| 5,105,780 A | 4/1992 | Richardson | |
| 5,109,817 A | 5/1992 | Cherry | |
| 5,222,993 A | 6/1993 | Crane | |
| 5,245,963 A | 9/1993 | Sabol et al. | |
| 5,271,365 A | 12/1993 | Oppenheim et al. | |
| 5,293,851 A | 3/1994 | Schaub | |
| 5,297,518 A | 3/1994 | Cherry | |
| 5,421,299 A | 6/1995 | Cherry | |
| 5,421,300 A | 6/1995 | Durling et al. | |
| 5,522,357 A * | 6/1996 | Nogi | F02B 1/10 123/261 |
| 5,533,476 A | 7/1996 | Anderson | |
| 5,609,130 A | 3/1997 | Neumann | |
| 5,611,307 A | 3/1997 | Watson | |
| 5,662,082 A | 9/1997 | Black et al. | |
| 5,778,849 A | 7/1998 | Regueiro | |
| 5,947,076 A | 9/1999 | Srinivasan et al. | |
| 6,016,785 A | 1/2000 | Divecha et al. | |
| 6,213,085 B1 | 4/2001 | Durling et al. | |
| 6,513,483 B2 | 2/2003 | Riggs | |
| 6,595,181 B2 | 7/2003 | Najt et al. | |
| 6,843,220 B2 | 1/2005 | Lausch et al. | |
| 6,953,020 B2 | 10/2005 | Kojic et al. | |
| 7,021,275 B2 | 4/2006 | Durling | |
| 7,107,964 B2 | 9/2006 | Kojic et al. | |
| 7,204,225 B2 | 4/2007 | Kubo et al. | |
| 7,398,743 B2 | 7/2008 | Fiveland | |
| 7,493,886 B2 | 2/2009 | Blank | |
| 7,950,364 B2 | 5/2011 | Nerheim | |
| 8,006,666 B2 | 8/2011 | Ashida et al. | |
| 8,074,620 B2 | 12/2011 | Filipek et al. | |
| 2006/0219210 A1 | 10/2006 | Bailey et al. | |
| 2009/0133667 A1* | 5/2009 | Inoue | F02B 19/12 123/260 |
| 2013/0000598 A1* | 1/2013 | Tokuoka | F02B 19/1023 123/254 |
| 2013/0019837 A1* | 1/2013 | Ishii | F02B 19/10 123/260 |
| 2014/0209057 A1* | 7/2014 | Pouring | F02B 19/12 123/257 |
| 2015/0068489 A1* | 3/2015 | Bunce | F02B 19/1057 123/262 |
| 2015/0184578 A1* | 7/2015 | Oda | F02B 19/18 123/260 |

FOREIGN PATENT DOCUMENTS

| | | |
|---|---|---|
| GB | 948686 | 2/1964 |
| WO | 9308385 A1 | 4/1993 |

* cited by examiner

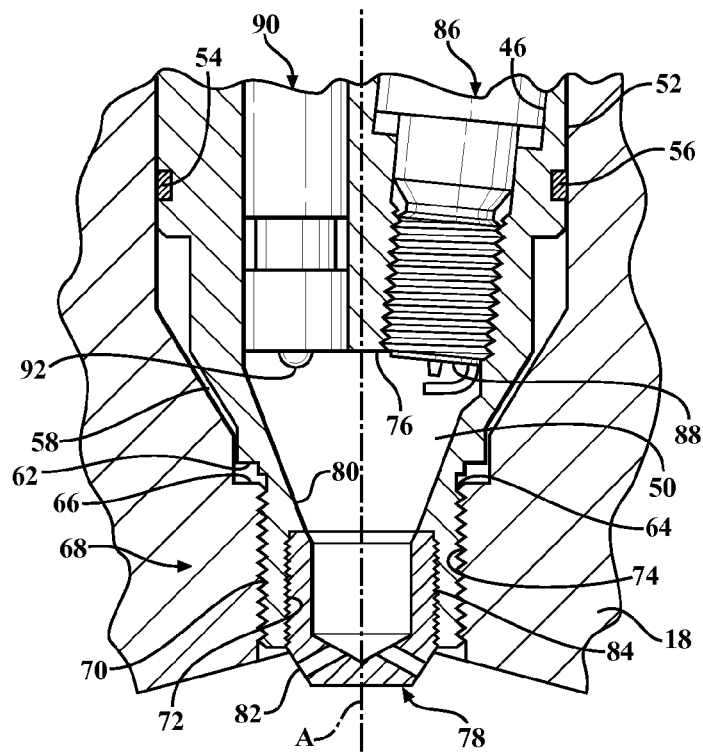
FIG. 4
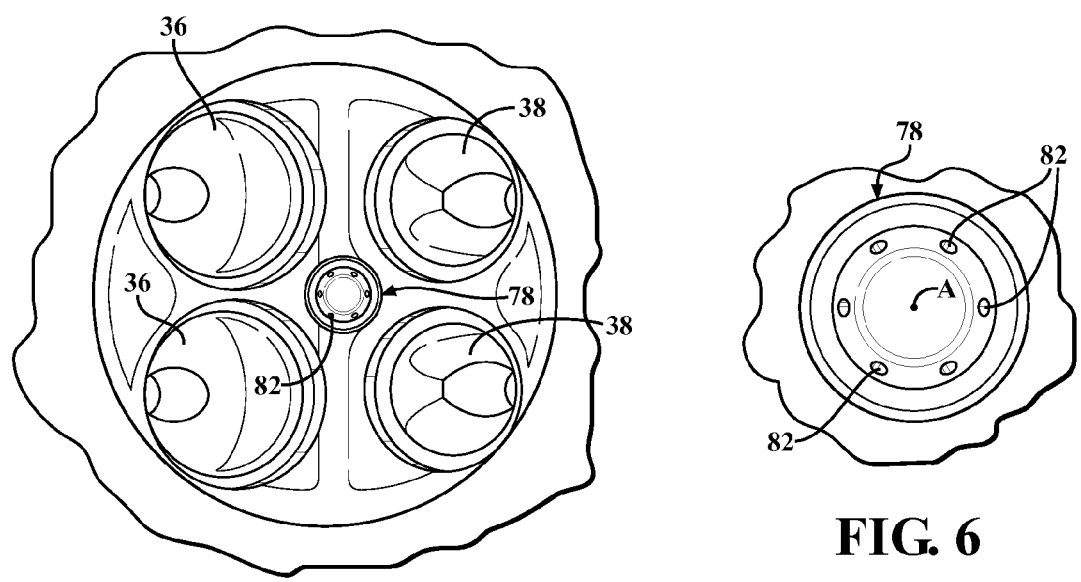
FIG. 5
FIG. 6

TURBULENT JET IGNITION PRE-CHAMBER COMBUSTION SYSTEM FOR SPARK IGNITION ENGINES

CROSS REFERENCE TO RELATED APPLICATIONS

This application is a continuation-in-part of U.S. patent application entitled "Turbulent Jet Ignition Pre-Chamber Combustion System for Spark Ignition Engines," having Ser. No. 13/286,638, and filed on Nov. 1, 2011, and claims the benefit of U.S. provisional patent application entitled "Turbulent Jet Ignition Pre-Chamber Combustion System for Spark Ignition Engines," having Ser. No. 61/408,892, and filed on Nov. 1, 2010.

BACKGROUND OF THE INVENTION

1. Field of the Invention

The present invention relates, generally, to an ignition system and, more specifically, to an ignition system for an internal combustion engine having at least one combustion chamber with an injector, ignition device, and a pre-chamber that may be employed to ignite a small charge, which is then used to ignite the main air fuel charge in the main combustion chamber of the internal combustion engine.

2. Description of the Related Art

Internal combustion engines known in the related art may generally include, among other basic components, an engine block having one or more cylinders, cylinder heads associated with the engine block, and pistons supported for reciprocal movement in each cylinder. The pistons are generally connected to a connecting rod which, in turn, rotates a crankshaft. Generally speaking, fuel is combusted within the cylinders to reciprocate the pistons. The piston drives the connecting rod, which drives a crankshaft, causing it to rotate within the engine block.

In addition to such standard arrangements, it is also known to employ pre-chambers where a small charge of fuel is ignited and then used to ignite the main charge in the main combustion chamber. Over the years, many different pre-chamber designs and arrangements have been proposed in the related art. However, internal combustion engines having pre-chambers have not been widely commercially accepted in the automotive industry, typically because they suffer from higher costs and complexity and sometimes without any significant increase in fuel economy or reduction in pollutants, such that the added cost cannot be justified.

Thus, there remains a need in the art for an ignition system for an internal combustion engine that improves fuel economy, reduces pollutants generated by the products of combustion, and that is not overly complex and is cost-effective to manufacture.

SUMMARY OF THE INVENTION

The present invention overcomes the disadvantages in the related art in an ignition system for an internal combustion engine having at least one combustion chamber. The ignition system includes a housing defined in the cylinder head of the internal combustion engine. The housing defines a pre-chamber. An ignition device is supported in the housing. The ignition device has an igniter portion that substantially faces the pre-chamber. An injector is supported in the housing. The injector has a nozzle that substantially faces the pre-chamber. The pre-chamber defines a proximate portion and a pre-chamber nozzle is disposed distally and spaced from the proximate portion of the pre-chamber. The pre-chamber nozzle includes a plurality of orifices having a diameter in a range between 0.7 mm to 2.0 mm and disposed spaced from one another and providing fluid communication between the pre-chamber and the combustion chamber. The igniter portion of the ignition device and the nozzle of the injector are operatively supported in the proximal portion of the pre-chamber such that the injector delivers a predetermined quantity of fuel into the pre-chamber. The igniter portion ignites the fuel in the pre-chamber such that the partially combusted pre-chamber products are forced through the orifices of the pre-chamber and extinguished, but dispersed through the main combustion chamber so as to ignite the main fuel charge therein.

In one embodiment, the turbulent jet ignition pre-chamber combustion system of the present invention employs an orifice diameter that is kept small to promote flame quenching as the combustion products exit out of the pre-chamber into the main combustion chamber. The combustion products then react with the main fuel charge and initiates combustion in the main fuel chamber at multiple locations through chemical, thermal and turbulent effects some distance away from the pre-chamber nozzle. In this way, the ignition system of the present invention is capable of high-drive cycle (part load) fuel economy improvements that can reach up to 30% over baseline conventional spark ignition systems in an optimized engine, as well as high-peak thermal efficiencies (greater than 45%) at wide-open throttle (WOT). These engine performance enhancements are due to a combination of combustion improvements, reduced heat losses, the near elimination of disassociation due to the low combustion temperatures and reduced engine throttling at part-load. Additionally, the ignition system of the present invention facilitates low temperature combustion that is capable of near zero engine-out NOx emissions, while overcoming previous pre-chamber combustion hurdles of reduced peak performance (BMEP) and uncontrollable hydrocarbon (HC) and carbon monoxide (CO) emissions when compared to conventional spark ignition combustion systems. Thus, the ignition system of the present invention can be utilized in engines with existing emission control systems found on conventional passenger vehicles (oxidation and three-way catalyst) to meet current and future emission regulations. Finally, the ignition system of the present invention also provides a "bolt on" fix capable of working with any spark ignition engine (pre- or post-production) with no base engine hardware modification required using carbon-based fuels.

Other objects, features, and advantages of the present invention will be readily appreciated as the same becomes better understood after reading the subsequent description taken in conjunction with the accompanying drawings.

BRIEF DESCRIPTION OF THE DRAWINGS

FIG. 4 is an enlarged partial cross-sectional side view illustrating the injector and ignition device flush mounted in the pre-chamber of the ignition system;

FIG. 5 is an elevational view of the upper portion of the combustion chamber illustrating the disposition of the ignition system relative to the intake and exhaust ports;

FIG. 6 is a partial elevational view illustrating the orifices of the pre-chamber nozzle;

DETAILED DESCRIPTION OF THE INVENTION

Figure 1:
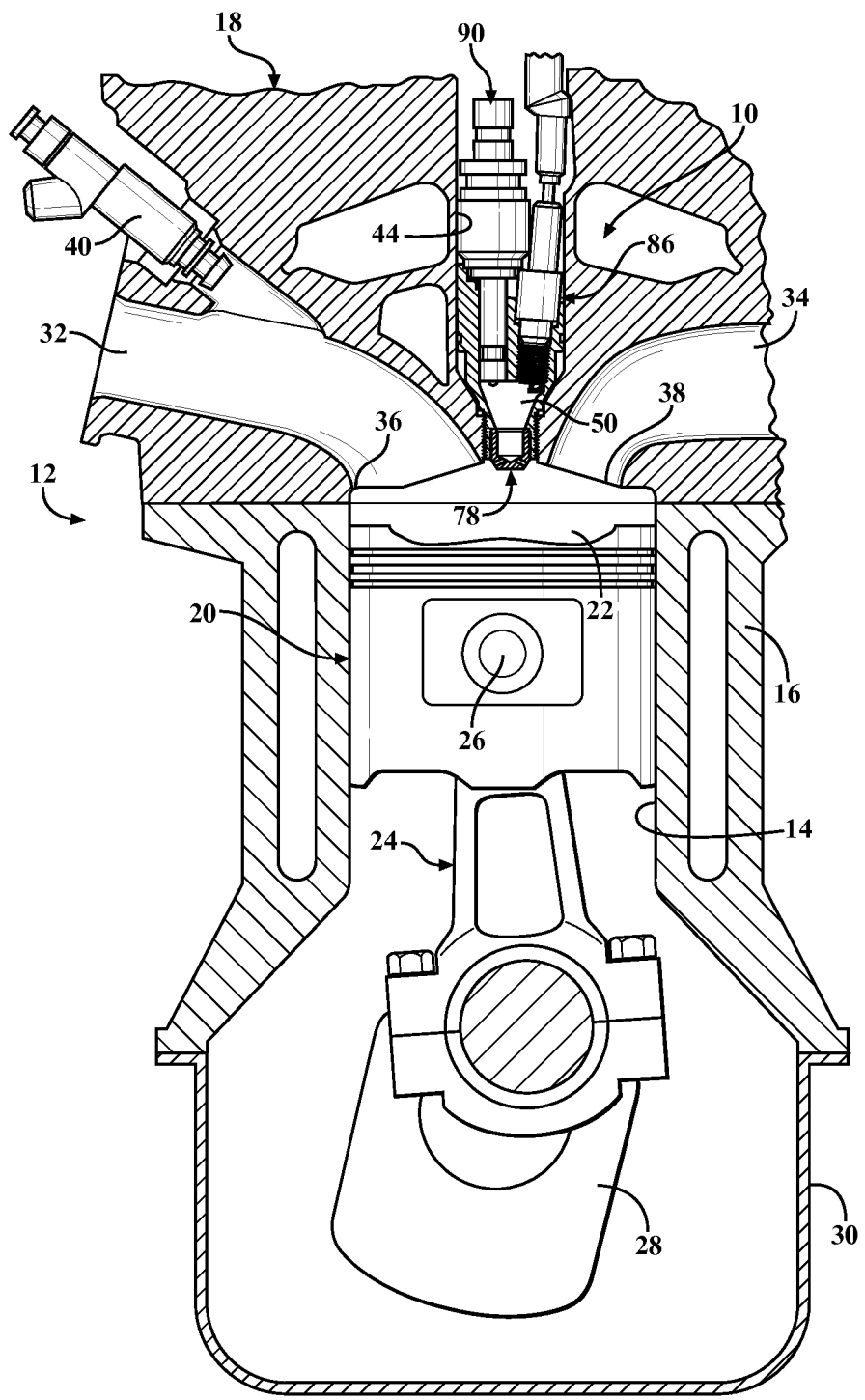
FIG. 1 is a partial cross-sectional side view of the ignition system of the present invention mounted in an internal combustion engine having at least one combustion chamber formed by a piston disposed in a cylinder and enclosed by a cylinder head.

The present invention overcomes the disadvantages in the related art in an ignition system, generally indicated at 10 in FIGS. 1-6, where like numerals are used to designate like structure throughout the drawings. As shown in FIG. 1, the present invention is particularly adapted for use in an internal combustion engine, generally indicated at 12. In this case, the ignition system 10 of the present invention is illustrated in connection with a single cylinder 14 of an internal combustion engine 12. Those having ordinary skill in the art will appreciate that the engine 12 illustrated in FIG. 1 is but one of the many configurations of an internal combustion engine with which the present invention may be employed. By way of example, the present invention may be employed in a two-stroke or four-stroke engine. In addition, the ignition system 10 may also be employed in a multiple-cylinder engine where the cylinders may be arranged in an inline, V-shaped, or flat manner, or any other manner commonly known in the art. The present invention may also be employed with a carburetor or fuel injected internal combustion engine having either port or direct injection of the fuel air charge into the main combustion chamber.

With continuing reference to FIG. 1, the internal combustion engine 12 includes an engine block 16 having one or more cylinders 14, and a cylinder head, generally indicated at 18, associated with the engine block 16. A piston, generally indicated at 20, is supported for repeated reciprocal movement in the cylinder 14. Together, the piston 20, cylinder 14 and cylinder head 18 cooperate to define a combustion chamber 22. A connecting rod, generally indicated at 24, is secured to the piston 20 through a piston pin 26. A crankshaft 28 is associated with the connecting rod 24 and an oil pan 30 is associated with the engine block 16. The cylinder head 18 defines an intake manifold 32 and an exhaust manifold 34. At least one intake port 36 is defined in the intake manifold 32 and at least one exhaust port 38 is defined in the exhaust manifold 34. The intake and exhaust ports 36, 38 are opened and closed via cam driven valves (not shown) to provide fluid communication between the cylinder 14 and the intake manifold 32 and the exhaust manifold 34, respectively. As illustrated in the view of the upper portion of the combustion chamber shown in FIG. 5, in one embodiment, the internal combustion engine 12 may include two intake ports 36 and two exhaust ports 38. However, those having ordinary skill in the art will appreciate that the internal combustion engine 10 may include any number of intake and exhaust ports. In addition, and in the embodiment illustrated in FIG. 1, the internal combustion engine 12 also includes a fuel injector 40 mounted in the intake manifold 32 as a means of introducing the main fuel/air charge into the combustion chamber 22 through the intake port 36. Similarly, products of combustion exit the combustion chamber 22 through the exhaust port 38. Those having ordinary skill in the art will appreciate that the engine 12 may employ an injector that injects the main fuel charge directly into the combustion chamber 22. Similarly, the engine 12 may also include a number of other conventional components that are commonly known in the art and will not be described in detail here.

Generally speaking, a fuel/air mixture is introduced into the combustion chamber 22 via the intake port 36. This constitutes the main fuel charge. The fuel is combusted in the combustion chamber 22 of the cylinder 14 to reciprocate the piston 20, as will be described in greater detail below. The piston 20 drives the connecting rod 24 which drives the crankshaft 28 causing it to rotate within the engine block 16. Specifically, the combustion pressure within the cylinder 14 drives the piston 20 downward in a substantially linear motion. On the other hand, movement of the crankshaft 28 drives the connecting rod 24 in a substantially rotational motion. The torque from the crankshaft 28 may be utilized to drive any other component or related systems as is commonly known in the art.

Figure 2:
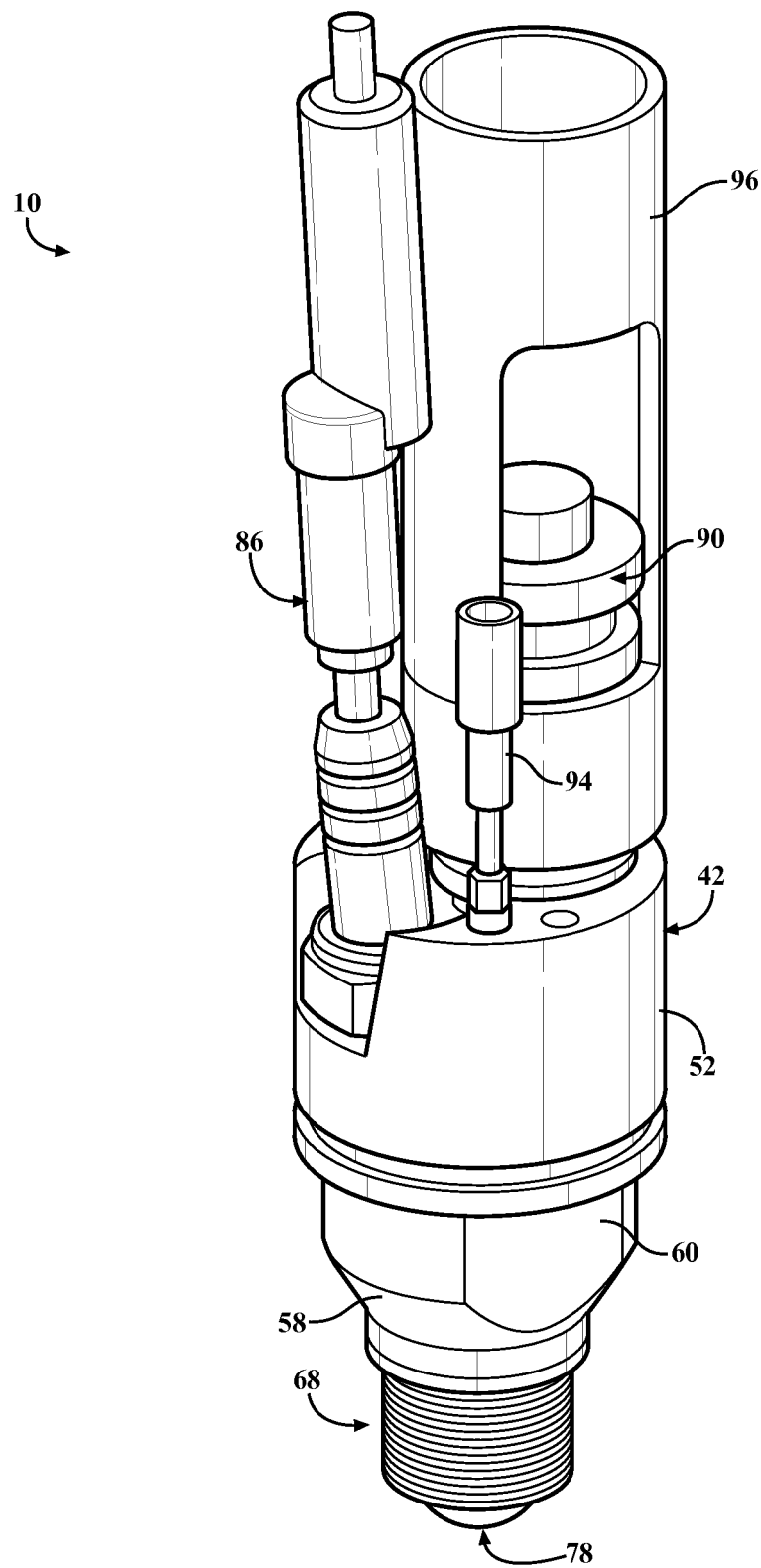
FIG. 2 is an enlarged perspective view of the ignition system of the present invention.
Figure 3:
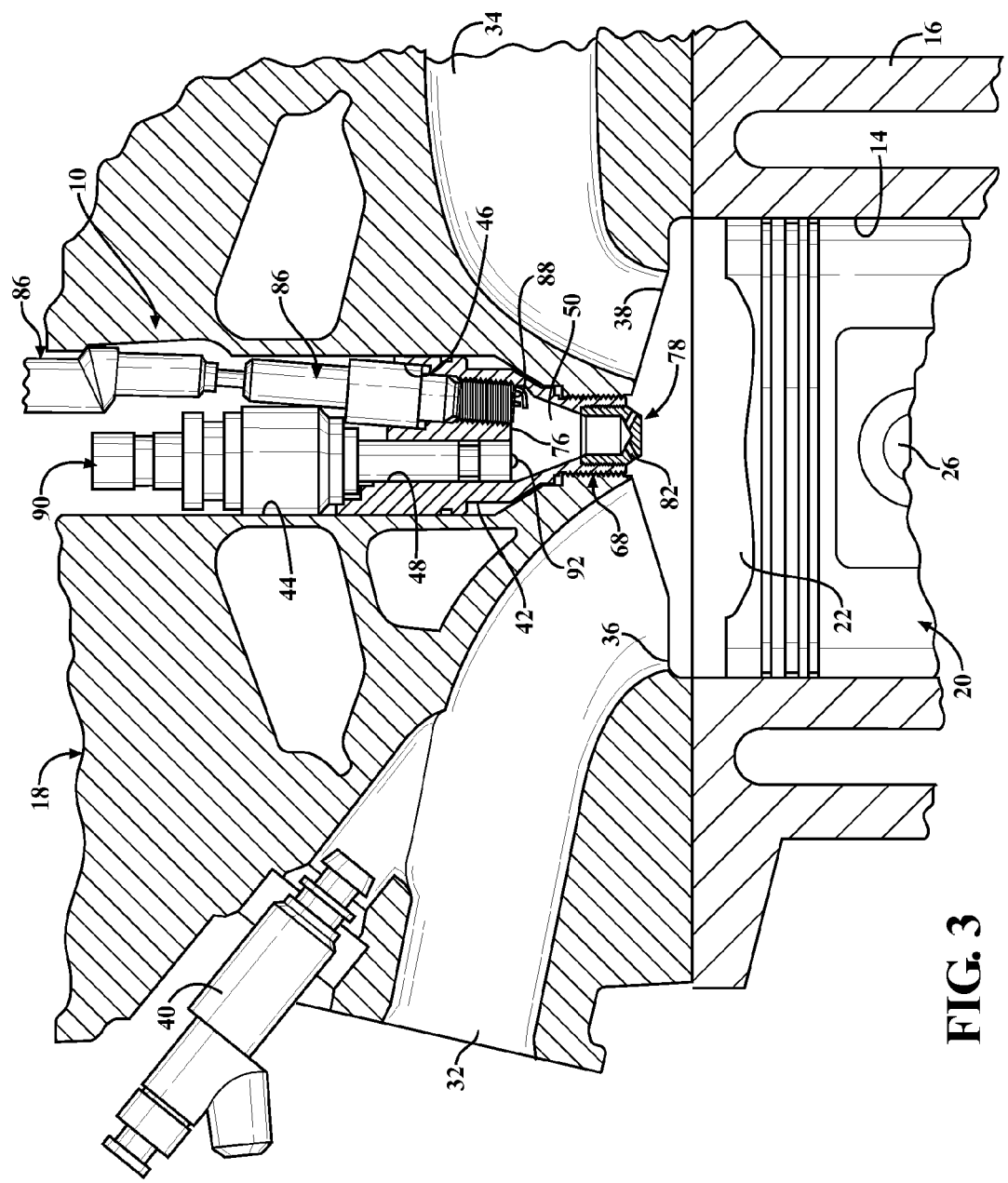
FIG. 3 is an enlarged partial cross-sectional side view of the ignition system of the present invention mounted in an internal combustion engine.

Referring now to FIGS. 2-6, the ignition system 10 of the present invention includes a housing, generally indicated at 42, that is defined in the cylinder head 18 of the internal combustion engine 12. In one embodiment, the housing 42 is a separate component that is operatively supported in the cylinder head 18 of the internal combustion engine. However, those having ordinary skill in the art will appreciate that the housing 42 may be essentially defined in and form an integral part of the cylinder head 18. In any event, and in the embodiment illustrated in these figures, the cylinder head 18 may include a port 44 (FIG. 1) that receives the housing 42 in a manner such that the housing 42 is sealingly engaged with the cylinder head 18, as will be described in greater detail below. In addition, and as described in greater detail below, the port 44 may be of the substantial size and location that formerly received a standard sparkplug in an internal combustion engine 12. This feature facilitates the retrofitting of existing engines with the ignition system 10 of the present invention. As best shown in FIG. 3, the housing 42 defines a sparkplug cavity portion 46, an injector cavity portion 48, and a pre-chamber 50. Each of these components and their interrelationship with other components of the ignition system 10 will be described in greater detail below.

The housing 42 also includes a substantially cylindrical portion 52 having an annular groove 54 disposed about the cylindrical portion 52. As best shown in FIG. 4, an O-ring seal 56 is operatively received in the groove 54 and adapted for sealing engagement with the cylinder head 18. In addition, the housing 42 also includes a frustoconically-shaped portion 58 having flats 60 formed thereon (FIG. 2). The flats 60 cooperate with corresponding surfaces formed on the cylinder head 18 to stabilize and help fix the housing 42 relative to the cylinder head 18 (FIG. 4). The frustoconically-shaped portion 58 terminates in a shoulder 62 that is juxtaposed to a shoulder 64 defined on the cylinder head 18. A sealing washer 66 may be employed between these two shoulders 62, 64 to seal the ignition system 10 within the cylinder head 18. The housing 42 also includes a terminal portion, generally indicated at 68, that includes external threads 70 and internal threads 72. The external threads 70 cooperate with threads 74 formed on the cylinder head 18 to mount the housing 42 therein. Those having ordinary skill in the art will appreciate that the ignition system may include any other appropriate seals or fastening mechanisms necessary to securely mount the ignition system in the cylinder head 18.

The pre-chamber 50 defines a proximal portion 76 and a pre-chamber nozzle, generally indicated at 78, disposed spaced from the proximal portion 76 of the pre-chamber 50. As best shown in FIG. 4, the pre-chamber 50 includes frustoconically-shaped sidewalls 80 that extend substantially from the proximal portion 76 to the pre-chamber nozzle 78 and defines a predetermined volume of the pre-chamber. The pre-chamber nozzle 78 defines a longitudinal axis A and includes a plurality of orifices 82 disposed spaced from one another and providing fluid communication between the pre-chamber 50 and the combustion chamber 22. In one embodiment, the orifices 82 have diameters in a range extending between 0.7 mm to 2.0 mm and are disposed about the longitudinal axis A in spaced relation with respect to each other. Moreover, and in one embodiment, the ratio of the orifice diameter to the pre-chamber volume is ideally in a range of 0.048 l/cm$^2$ to 0.067 l/cm$^2$. This ratio provides optimal minimum and maximum proportional component sizing to ensure effective penetration of radical turbulent jets into the main combustion chamber. This effective penetration in turn ensures optimal distribution of the ignition points resulting from the radical turbulent jets in the main combustion chamber thereby producing an effective and optimal combustion event as will be described in greater detail below. The pre-chamber nozzle 78 is substantially cup shaped and includes external threads 84 that cooperate with the internal threads 72 on the terminal portion 68 of the housing 42 to mount the nozzle 78 thereon.

The ignition system 10 also includes an ignition device, generally indicated at 86, operatively received in the sparkplug cavity portion 46. The ignition device 86 includes an igniter portion 88 that substantially faces the pre-chamber 50. Likewise, an injector 90 is operatively received in the injector cavity portion 48. The injector 90 has a nozzle 92 that substantially faces the pre-chamber 50. The ignition system 10 also includes a cooling tube 94 (FIG. 2) that provides fluid communication between a source of cooling fluid and the housing 42. The cooling fluid may be either air, water, or any other fluid suitable for this purpose. However, those having ordinary skill in the art will appreciate that the cooling tube 94 and the provision for a cooling fluid is optional. In addition, the ignition system 10 of the present invention may also employ a direct-injection installation sleeve 96 (FIG. 2) that surrounds the injector 90 and stabilizes this component within the port 44 formed in the cylinder head 18.

In one embodiment, the igniter portion 88 of the ignition device 86 and the nozzle 92 of the injector 90 are operatively supported in the proximal portion 76 of the pre-chamber 50 and disposed flush therewith such that the injector 90 delivers a predetermined quantity of fuel into the pre-chamber 50. The igniter portion 88 ignites the fuel in the pre-chamber 50. Once ignited, the fuel is forced through the orifices 82 of the pre-chamber nozzle 78 such that the flame is extinguished. Even though extinguished, the products of this pre-chamber combustion are disbursed through the combustion chamber 22 so as to ignite the main fuel charge therein.

Figure 7:
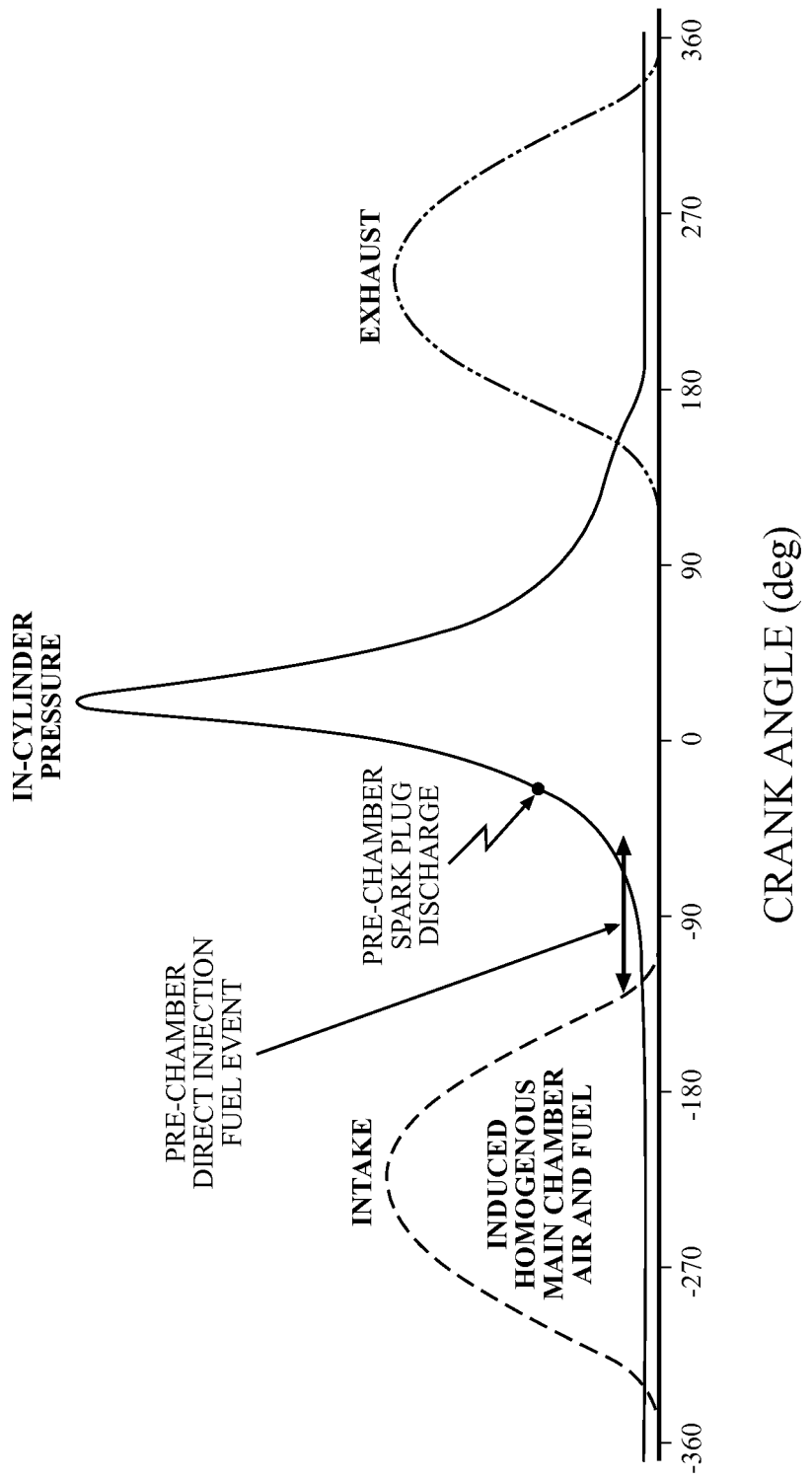
FIG. 7 is a graph illustrating the ignition sequence for the ignition system of the present invention over one complete engine cycle.

An ignition sequence employing the ignition system 10 of the present invention is illustrated in FIG. 7. The ignition sequence differs from conventional spark ignition fueling strategy in that there is an addition of pre-chamber fuel (approximately 2% of total energy) that is injected into the pre-chamber 50 via the injector 90 and then ignited via the ignition device 86. The pre-chamber fueling event is timed to end at approximately 50° before spark discharge. This ensures that a rich, plentiful mixture can be contained in the pre-chamber 50 which has been proven to chemically enhance the combustion process through the formation of active radicals.

The net effect of this phenomenon is to create a condition called "turbulent jet ignition." Turbulent jet ignition enables very fast burn rates due to the ignition system 10 producing multiple, distributed ignition sites which consume the main charge rapidly and with minimum combustion variability. The relatively small size of the orifices 82 causes burning mixture to travel quickly through the orifices 82 which, as mentioned above, extinguishes the flame, but seeds the combustion chamber 22 with partially combusted pre-chamber products. The pre-chamber combustion products entrain and ignite the main chamber charge through chemical, thermal, and turbulence effects some distance away from the pre-chamber 50, thus producing a distributed ignition system.

As noted above, the diameter of the orifices 82 and the ratio of these diameters to the volume of the pre-chamber create a turbulent jet that penetrates deeper into the main charge. To this end, and as a means of avoiding impinging on the combustion chamber wall, in one preferred embodiment, the pre-chamber volume is relatively small. The fast burn rates allow for increased levels of dilution (lean burn and/or exhaust gas recirculation [EGR]) when compared to conventional spark ignition combustion. The high diluent fraction has enabled the ignition system 10 of the present invention to record an 18% improvement in fuel consumption in a non-optimized engine when compared to conventional stoichiometric spark ignition combustion. However, it is projected that the present invention will realize as much as 30% improvement in fuel consumption in an engine that has an optimized combustion chamber. The efficiency improvements are due to a combination of combustion improvements, the near elimination of dissociation due to low combustion temperatures and reduced engine throttling. Additionally, the low temperature combustion has resulted in single digit parts per million (ppm) engine out (NOx) emissions with controllable levels of HC and CO emissions.

FIGS. 8A-8H display relevant data derived from a single cylinder performance of the ignition system of the present invention including efficiency and emission comparisons between the present invention and standard spark ignition engines at fixed speed/load worldwide mapping point of 1.500 rev/min, 3.3 bar indicated net mean effective pressure (IMEPn). The spark ignition tests were conducted with gasoline which was port fuel injected, while the ignition system of the present invention utilized a mixture of approximately 98% gasoline and 2% propane. The gasoline was port fuel injected into the main chamber while the propane was directly injected into the pre-chamber. However, those having ordinary skill in the art will appreciate that any carbon based fuel can be used for the pre-chamber fuel.

Figure 8A:
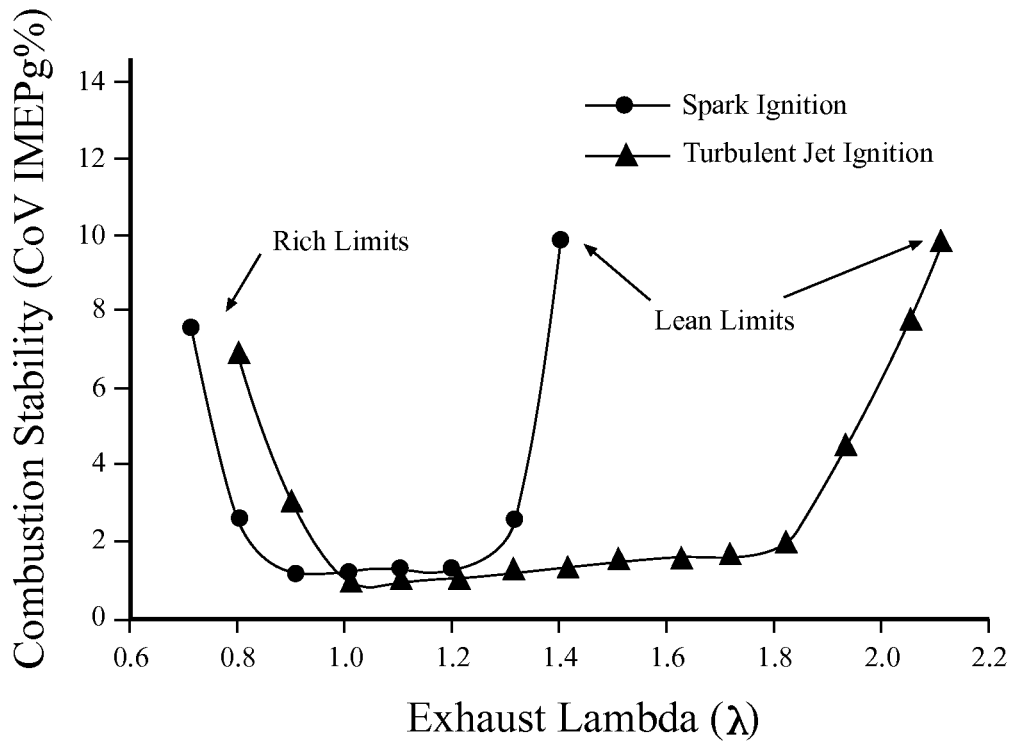
FIG. 8A is a graph illustrating combustion stability versus exhaust lambda ($\lambda$) in a comparison of a spark ignition and turbulent jet ignition system of the present invention.

More specifically, FIG. 8A illustrates a combustion stability comparison up to 10% co-efficient of variance in gross IMEP (CoV IMEPg) limit for both rich and lean conditions. The excess air results show that the ignition system of the present invention can operate up to an exhaust $\lambda$ of 2.1 compared to only 1.4 for standard spark ignition systems.

Figure 8B:
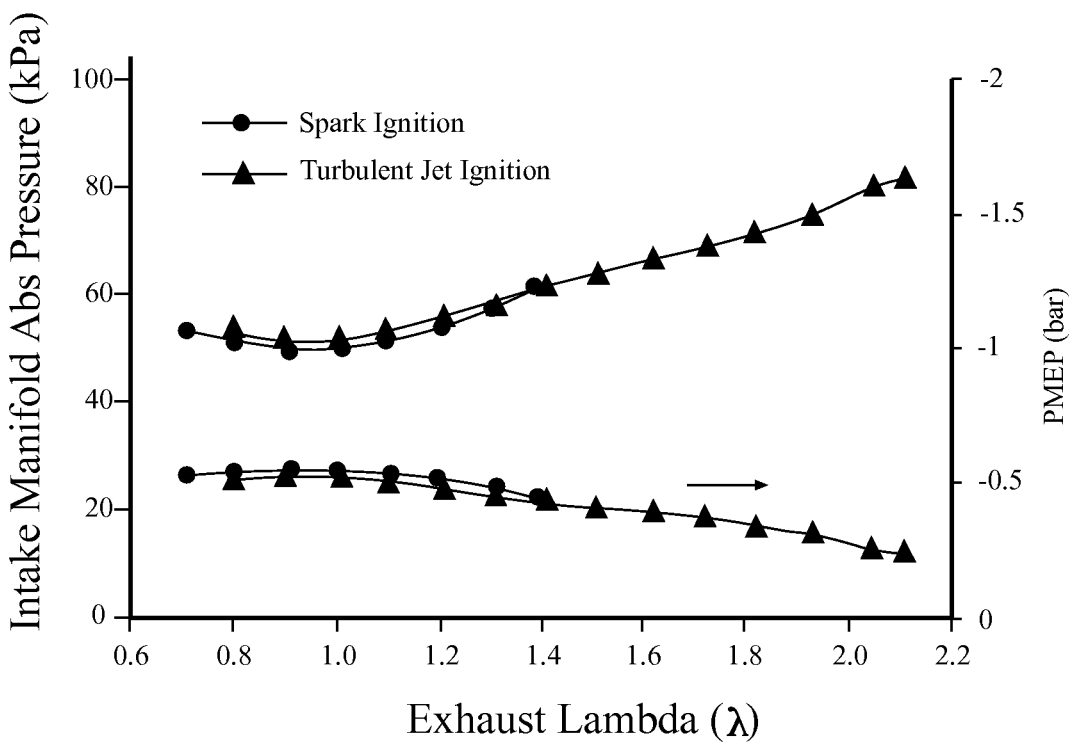
FIG. 8B is a graph illustrating intake manifold absolute pressure as well as pumping mean effective pressure versus exhaust $\lambda$ in a comparison of a spark ignition and turbulent jet ignition system of the present invention.
Figure 8C:
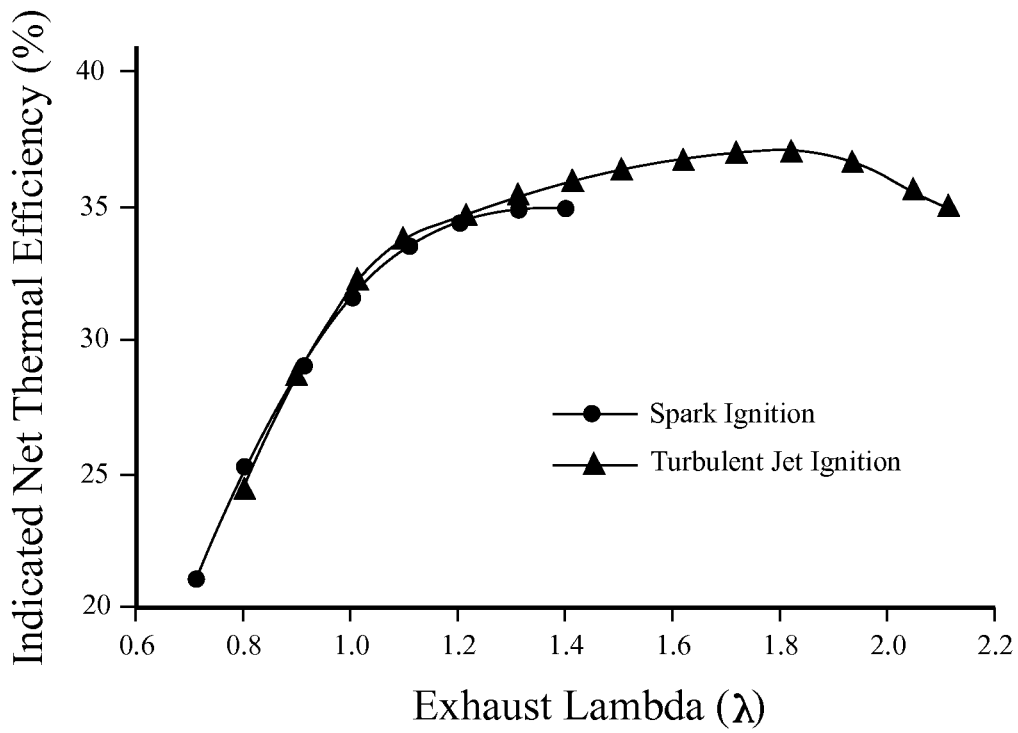
FIG. 8C is a graph of thermal efficiency versus exhaust $\lambda$ in a comparison of a spark ignition and turbulent jet ignition system of the present invention.
Figure 8D:
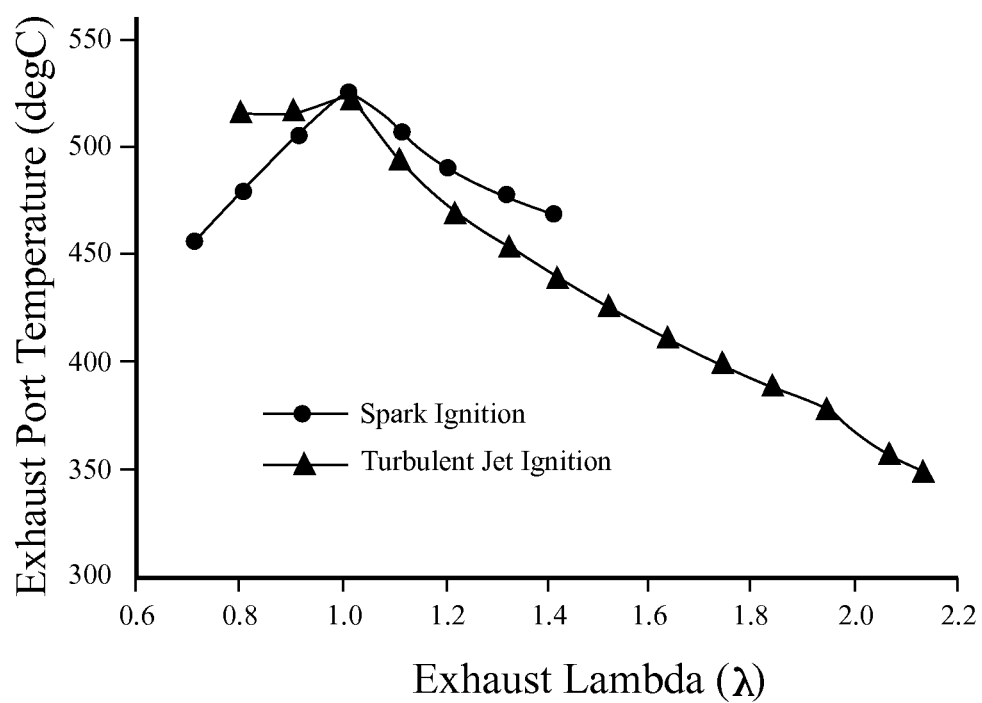
FIG. 8D is a graph illustrating exhaust port temperature versus exhaust $\lambda$ in a comparison of a spark ignition and turbulent jet ignition system of the present invention.

FIGS. 8B, 8C and 8D illustrate that the lower exhaust temperatures associated with high excess air rates may be near the lower temperature limits needed for efficient HC and CO oxidation. For equivalent exhaust $\lambda$, the ignition system of the present invention produces exhaust temperatures that are, on average, 20° C. to 40° C. lower than spark ignition due to improved burn rates which minimize the host lost to the exhaust system. In addition, another major benefit of the ignition system of the present invention when compared to other low temperature combustion systems is that the combustion phasing can be manipulated by altering the pre-chamber spark discharge, thus providing a relatively simple method of combustion control for emissions and fuel economy. In addition, these figures illustrate that the engine de-throttling (increased manifold pressure while maintaining the same load) using the ignition system of the present invention operates at approximately 30 kPa higher MAP for the same load relative to stoichiometric spark ignition. This enables pumping losses to be reduced by approximately 0.3 BAR PMEP.

Figure 8E:
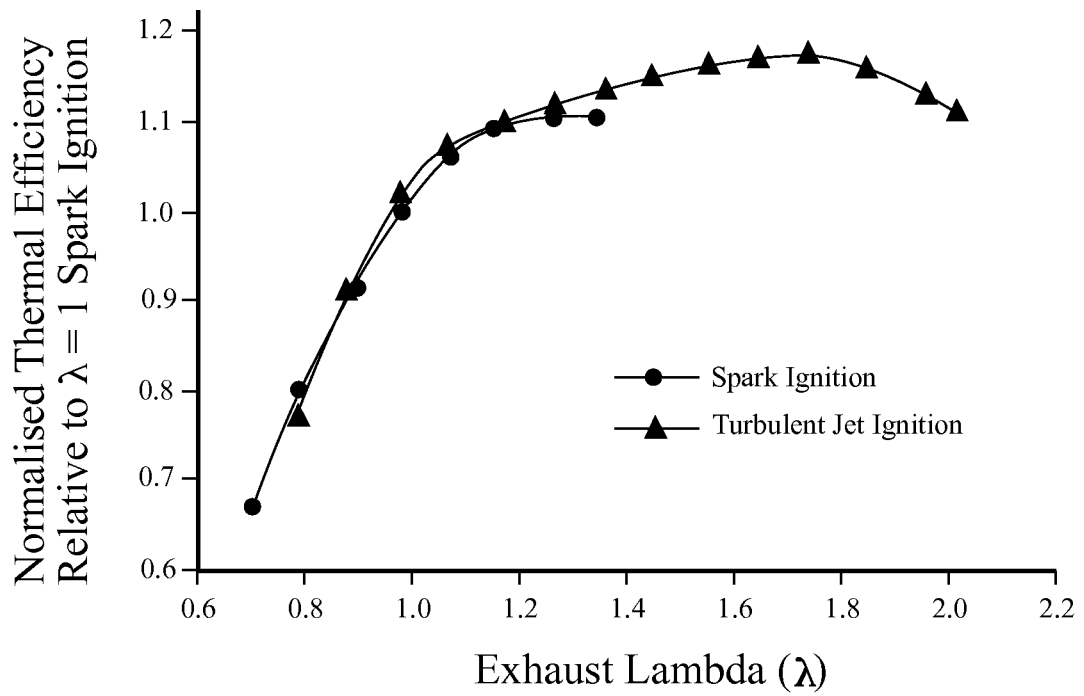
FIG. 8E is a graph illustrating normalized thermal efficiency relative to $\lambda$ equals one (stoichiometric operation) spark ignition versus exhaust $\lambda$ in a comparison of a spark ignition and turbulent jet ignition system of the present invention.

FIG. 8E highlights the fact that the ignition system of the present invention, when employed in a single cylinder test facility, was able to produce an 18% fuel economy improvement when compared to stoichiometric spark ignition combustion. As noted above, the efficiency improvements are due to a combination of combustion improvements, the near elimination of dissociation due to the low combustion temperatures, and the reduced engine throttling.

Figure 8F:
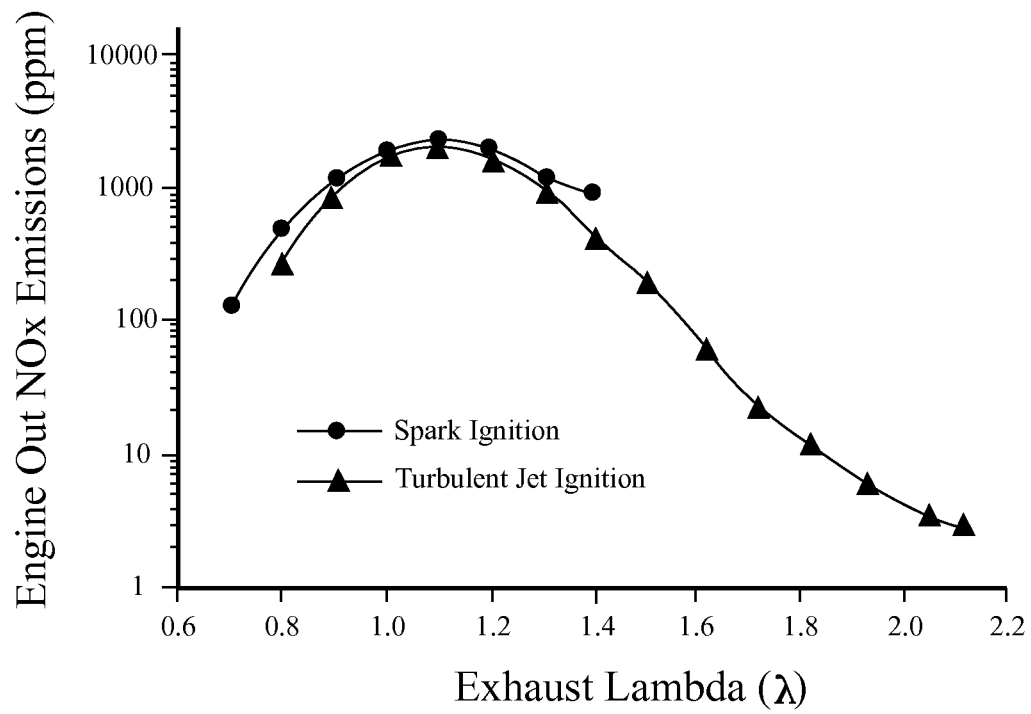
FIG. 8F is a graph illustrating engine out NOx emission versus exhaust $\lambda$ in a comparison of a spark ignition and turbulent jet ignition system of the present invention.
Figure 8G:
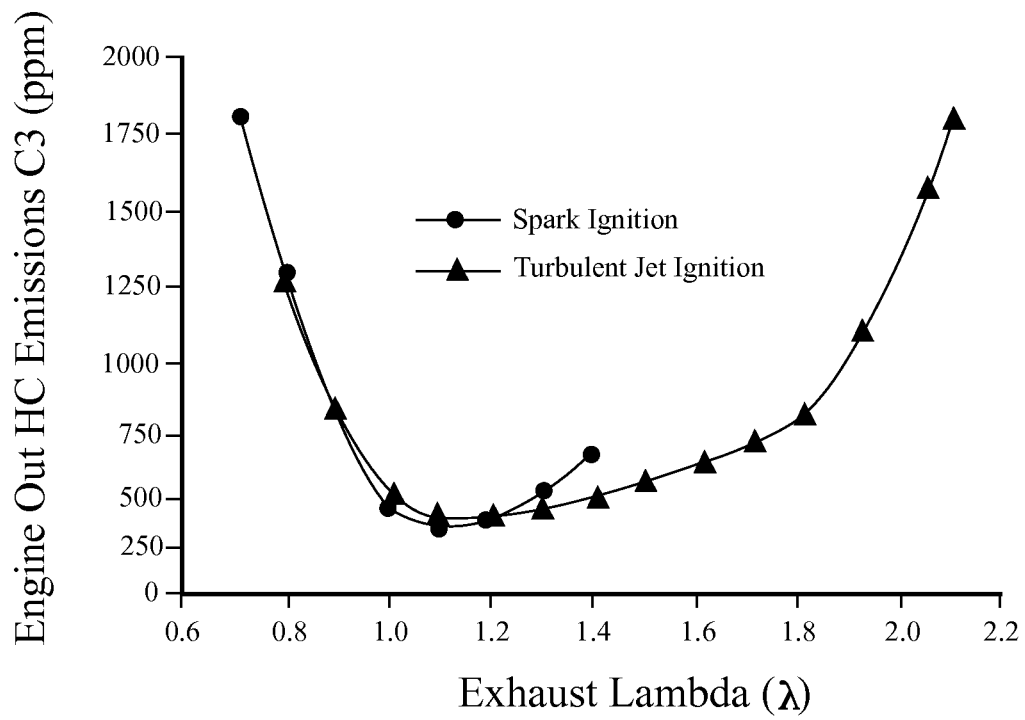
FIG. 8G is a graph of engine out HC emissions versus exhaust $\lambda$ in a comparison of a spark ignition and turbulent jet ignition system of the present invention.

FIGS. 8F and 8G illustrate engine out emission comparisons between the engine employing the ignition system of the present invention versus a standard spark ignition engine. As noted above, with the ignition system of the present invention, the internal combustion engine may employ high levels of excess air in the main fuel/air charge. High levels of excess air facilitates very low engine out NOx emissions due to the lower peak combustion temperatures. FIGS. 8F and 8G illustrate that when the jet ignition system of the present invention is employed in an internal combustion engine, NOx emissions are reduced to almost zero levels (less than 10 ppm) for exhaust $\lambda$ values greater than 1.8. This benefit associated with the ignition system of the present invention offers unique emission control opportunities and strategies that are not possible with spark ignition lean burn applications. The very low engine out NOx emissions past $\lambda$1.8 offer the possibility of eliminating the requirement for lean NOx after treatment for emission control. Rather, with the ignition system of the present invention engine out emissions can be controlled with a conventional three-way catalyst.

Figure 8H:
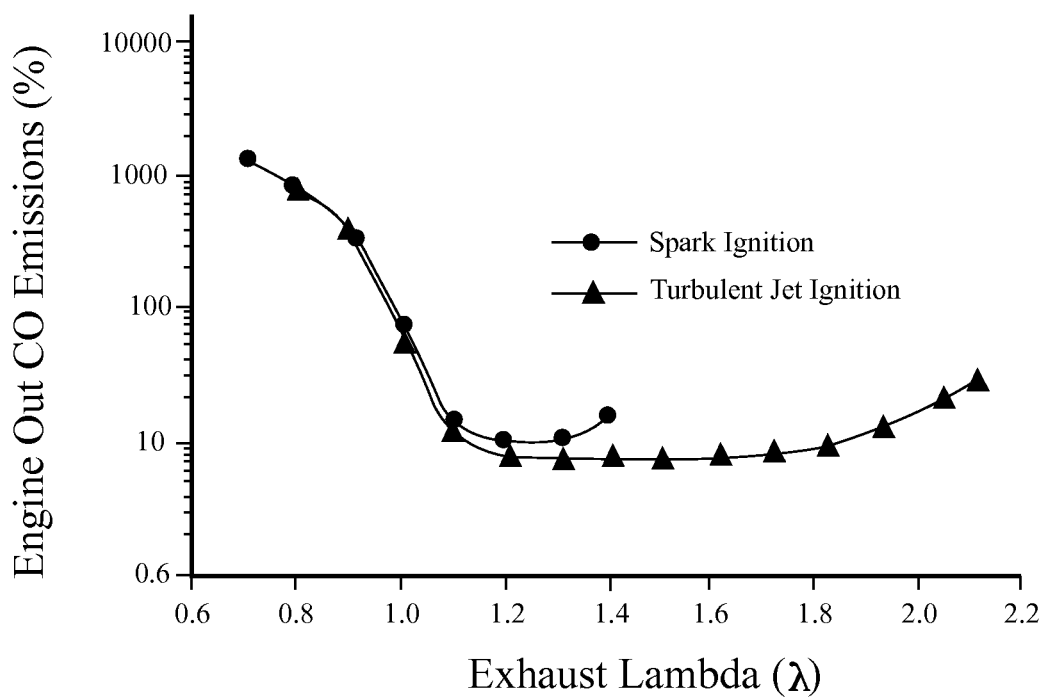
FIG. 8H is a graph illustrating engine out CO emissions versus exhaust $\lambda$ in a comparison of a spark ignition and turbulent jet ignition system of the present invention.

FIGS. 8G and 8H provide comparisons for HC and CO emissions between the two systems. These two figures highlight the fact that there are significant increases displayed as the rich or lean dilution limit is reached for each combustion system.

Figure 9A:
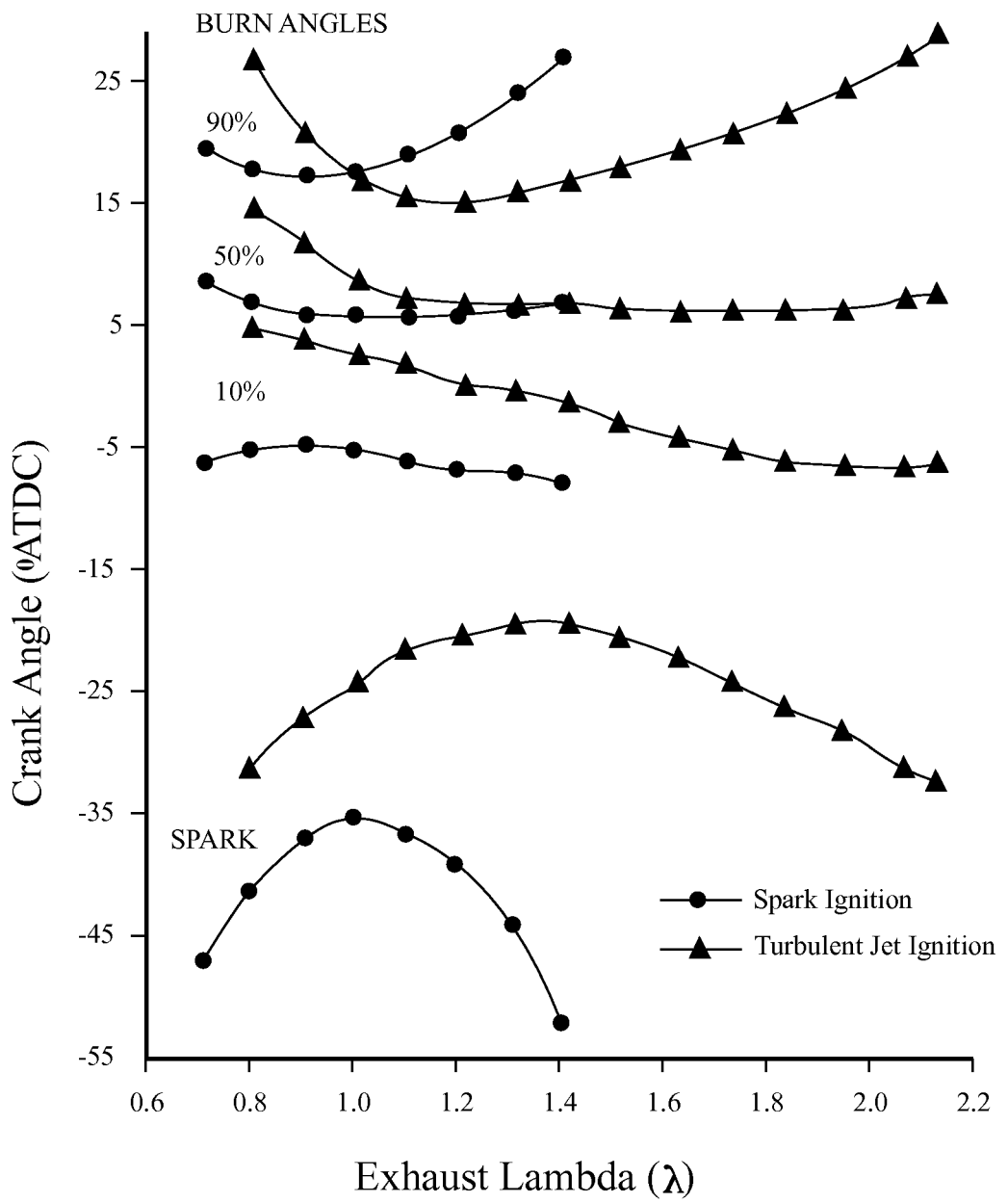
FIG. 9A is a graph of crank angles versus exhaust $\lambda$ illustrating the burn angles in a comparison of a spark ignition and turbulent jet ignition system of the present invention.

FIGS. 9A through 9E illustrate combustion burn comparisons for both spark ignition and an internal combustion engine employing the ignition system of the present invention with increasing dilution levels up to the combustion stability limit of 1,500 rev/min, 3.3 BAR IMEPn. FIG. 9A shows the spark discharge at 10%, 50%, and 90% burn angle locations. The burn angle represents the crank angle taken to burn 10-90% of the mass fraction (the fuel charge). FIGS. 9B and 9D and FIGS. 9C and 9E highlight the 0-10% and 10-90% mass fraction burn durations, respectively.

The data related to the burn angles illustrated in FIG. 9A illustrates that the ignition system of the present invention can tolerate considerably higher levels of dilution in the lean region. The distributed ignition caused by the turbulent jets that results from the ignition system of the present invention provides significantly increased burn rates, with faster flame initiation and hence propagation. It is also noted that the optimum 50% burn angle for both spark ignition and the ignition system of the present invention occurs in the 6-8° ATDC CA range across varying excess air dilution, despite a fundamentally different combustion process. Moreover, with the ignition system of the present invention, flame initiation occurs more rapidly than with spark ignition across the entire dilution range.

Figure 9B:
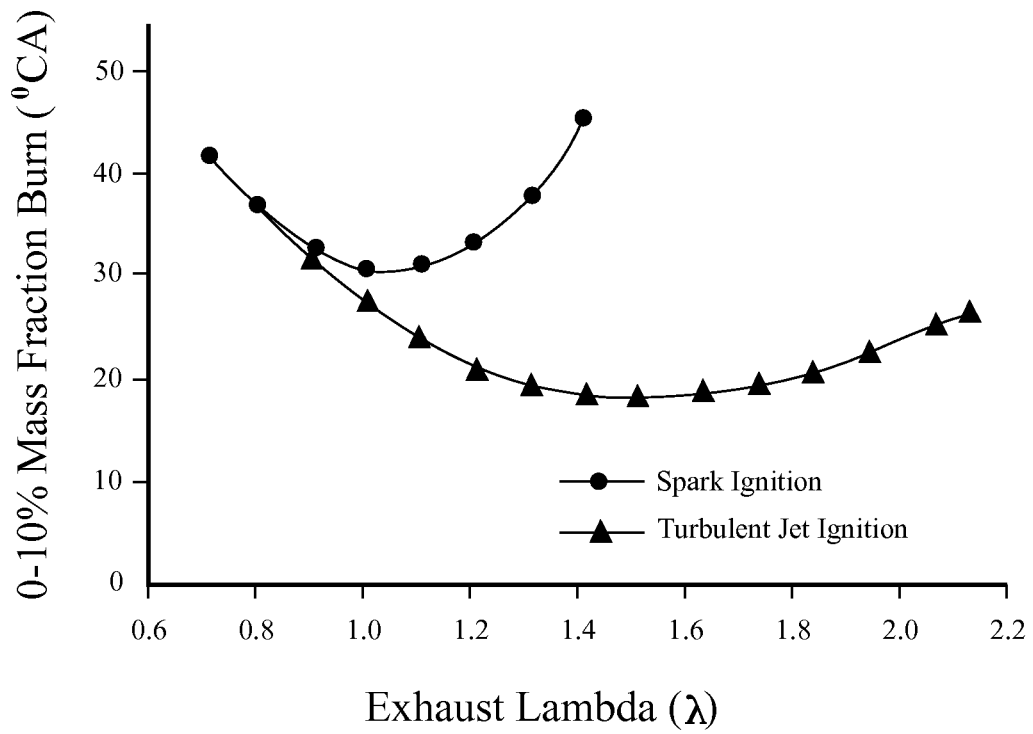
FIGS. 9B and 9D are graphs illustrating 0-10% mass fraction burn versus exhaust $\lambda$ in a comparison of a spark ignition and turbulent jet ignition system of the present invention.
Figure 9C:
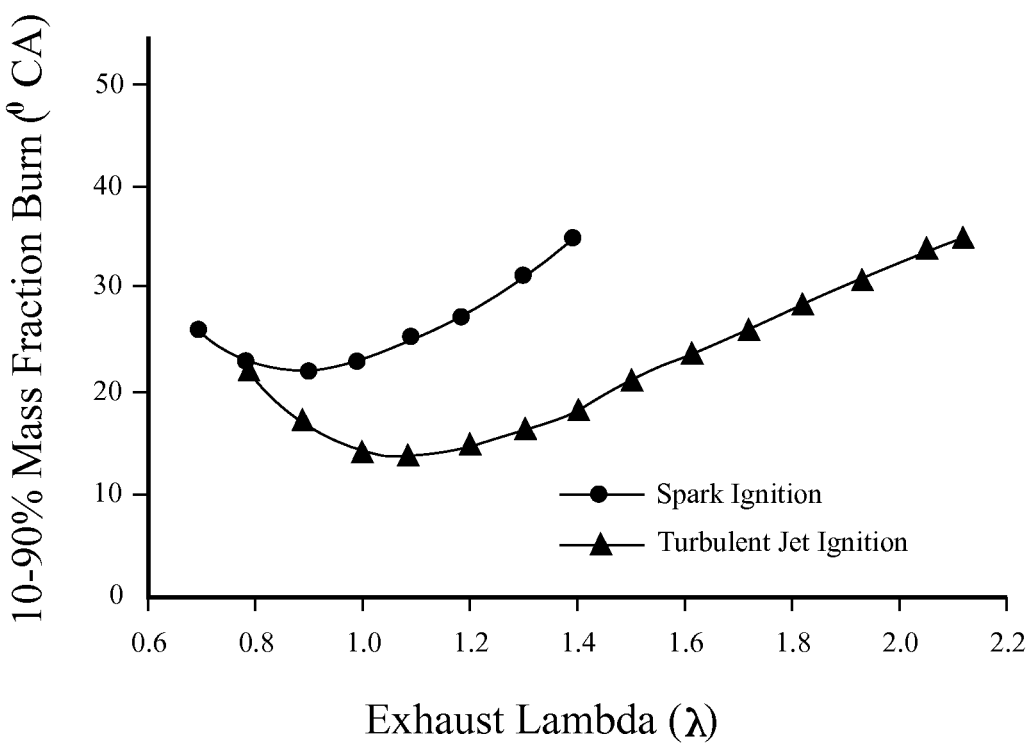
FIGS. 9C and 9E are graphs illustrating 10-90% mass fraction burn versus exhaust $\lambda$ in a comparison of a spark ignition and turbulent jet ignition system of the present invention.
Figure 9D:
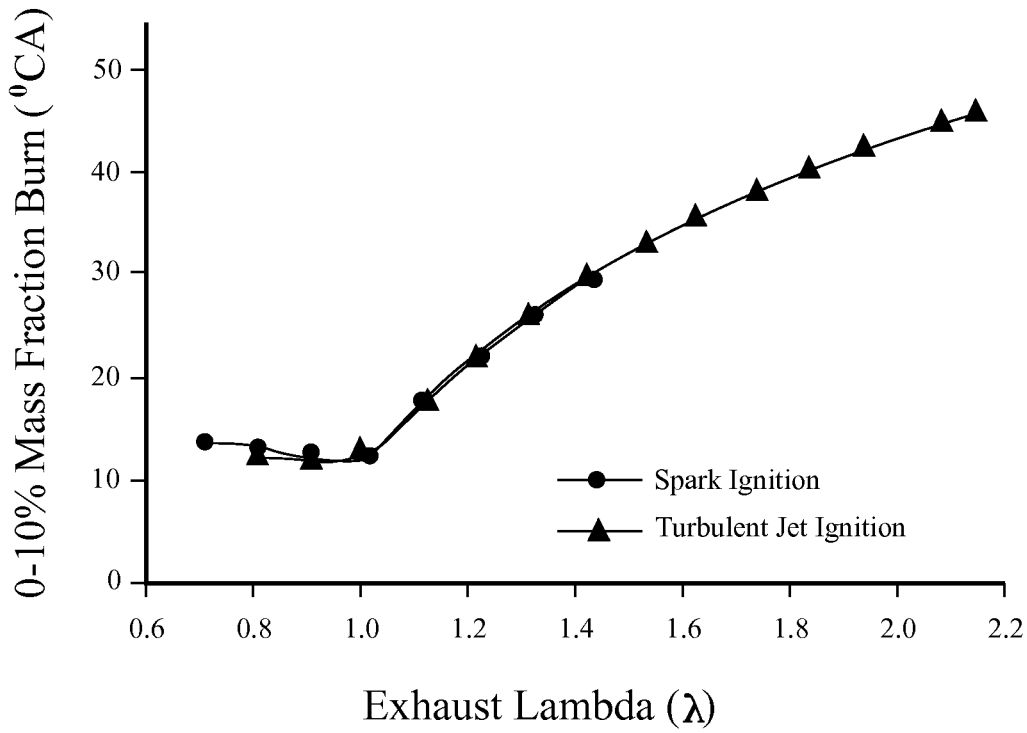

As best shown in FIGS. 9B and 9D, the excess air turbulent jet ignition 0-10% mass fraction burn results highlight that the flame initiation does not significantly change with increasing $\lambda$, hovering constantly near 20-25° CA. This is due to the near constant mixture composition in the pre-chamber coupled with the distributed ignition sites provided by the jets and the high levels of chemically active species present in the combusting jets. In the case of an internal combustion engine employing spark ignition, it takes longer to initiate and stabilize the flame kernel after the spark discharge due to the reduced kernel growth associated with the diluted mixture.

Figure 9E:
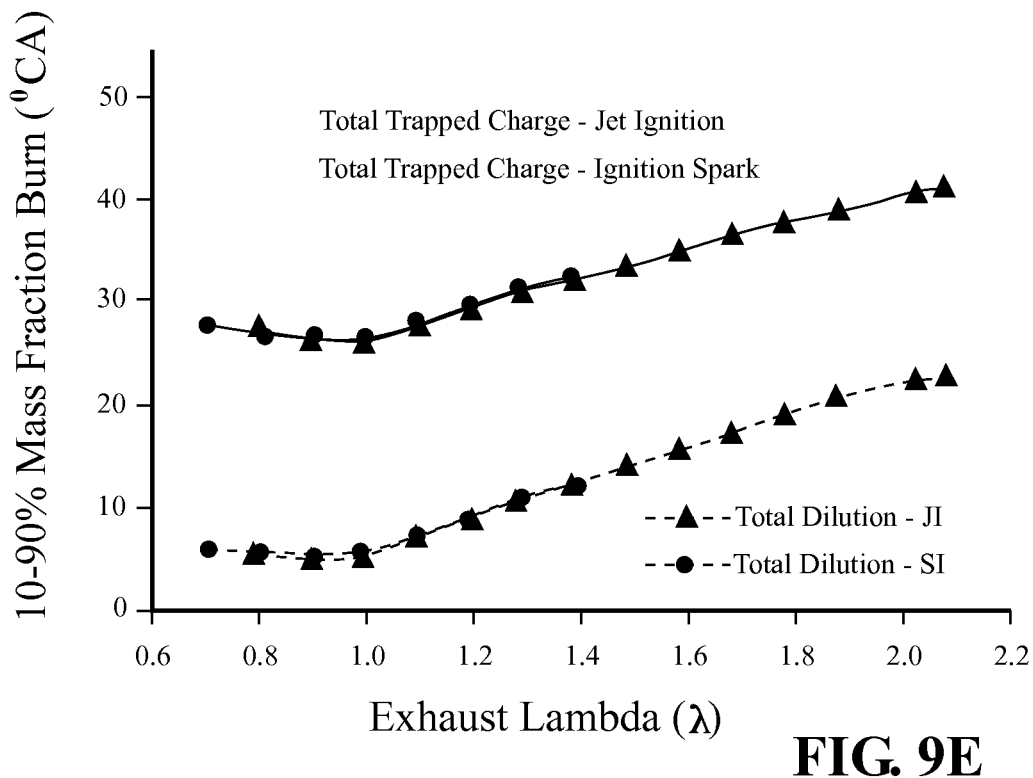

The 10-90% mass fraction burn data shown in FIGS. 9C and 9E is indicative of the mixture's ability to propagate a flame. These results highlight the fact that in cases, flame propagation slows with increasing dilution due to reduced flame speeds associated with richer or leaner mixtures and lower combustion temperatures. As with the 0-10% burn duration, the 10-90% burn duration is shorter with the ignition system of the present invention than with spark ignition. The effect of the jet is less pronounced during the flame propagation part of the burn process as once the gasoline is ignited in the main chamber, the 10-90% burn data is more an indication of the multiple flame fronts propagating through the main fuel. However, the pre-chamber fuel continues to play a role during the main fuel combustion, as is evident by the shorter burn duration that occurs with the ignition system of the present invention relative to spark ignition. This is due to the enhanced combustion provided by the pre-chamber fuel and the high levels of active radicals produced in the combusting jet being maintained in the propagating flame.

Thus, the ignition system of the present invention achieves significantly improved operating parameters by employing a number of features that facilitate these results. For example, the relatively small pre-chamber volume of less than 2% of the clearance volume minimizes crevice volume, HC emissions, heat loss, surface-to-volume ratio effects and pre-chamber residual gas. The relatively small orifices 82 (having diameters in a range between 0.7 mm to 2.0 mm in size) that provide fluid communication between the pre-chamber 50 and the main combustion chamber 22 allow flame quenching and penetration into the combustion chamber 22. Combusted pre-chamber products (chemical, thermal, and turbulent effects) initiate main chamber combustion in multiple locations. In addition, the separately fueled pre-chamber 50 that employs a flush-mounted electronically controlled direct injector 86 allows a rich mixture to be contained in the pre-chamber 50 while the combustion chamber 22 is heavily diluted with excess air and/or EGR. The location of the injector 86 at the proximal portion 76 of the pre-chamber 50 assists in scavenging the pre-chamber residuals and minimizing crevice volume. Where the internal combustion engine employs a separately fueled combustion chamber 22 using an electronically controlled port fuel injection, for example, or direct injection, the present invention allows homogenous or stratified combustion chamber mixtures and thus HC/NOx emission control. In addition, the spark plug initiated pre-chamber combustion employing a flush mounted ignition device 86 with electronically controlled ignition allows simple combustion phasing control. Moreover, the ignition system 10 of the present invention utilizes commercially available fuel such as gasoline, propane or natural gas, for both the main and pre-chamber combustion cavities.

In this way, the ignition system of the present invention is capable of high-drive cycle (part load) fuel economy improvements that can reach up to 30% over baseline conventional spark ignition systems in an optimized engine, as well as high-peak thermal efficiencies (greater than 45%) at wide-open throttle (WOT). These engine performance enhancements are due to a combination of combustion improvements, reduced heat losses, the near elimination of disassociation due to the low combustion temperatures and reduced engine throttling at part-load. Additionally, the ignition system of the present invention facilitates low temperature combustion that is capable of near zero engine-out NOx emissions, while overcoming previous pre-chamber combustion hurdles of reduced peak performance (BMEP) and uncontrollable hydrocarbon (HC) and carbon monoxide (CO) when compared to conventional spark ignition combustion systems. Thus, the ignition system of the present invention can be utilized in engines with existing emission control systems found on conventional passenger vehicles (oxidation and three-way catalyst) to meet current and future emission regulations. Finally, the ignition system of the present invention also provides a "bolt on" fix capable of working with any spark ignition engine (pre- or post-production) with no base engine hardware modification required.

The present invention has been described in an illustrative manner. It is to be understood that the terminology that has been used is intended to be in the nature of words of description rather than of limitation. Many modifications and variations of the present invention are possible in light of the above teachings. Therefore, the present invention may be practiced other than as specifically described.

What is claimed is:

1. An ignition system for an internal combustion engine having at least one combustion chamber, said ignition system comprising:
    a housing defined in the cylinder head of the internal combustion engine, said housing defining a pre-chamber;
    an ignition device supported in said housing and having an igniter portion that substantially faces said pre-chamber;
    an injector supported in said housing and having a nozzle that substantially faces said pre-chamber;
    said pre-chamber defining a proximal portion and a pre-chamber nozzle disposed spaced from said proximal portion of said pre-chamber, said pre-chamber nozzle including a plurality of orifices having a diameter in a range between 0.7 mm to 2.0 mm and disposed spaced from one another and providing fluid communication between said pre-chamber and the combustion chamber;
    said igniter portion of said ignition device and said nozzle of said injector operatively supported in the proximal portion of the pre-chamber such that said injector delivers a predetermined quantity of fuel into said pre-chamber, said igniter portion ignites the fuel in said pre-chamber such that the ignited fuel is forced through said orifices of said pre-chamber nozzle and extinguished, but dispersed through the combustion chamber so as to ignite the main fuel charge therein.

2. The ignition system as set forth in claim 1 wherein said pre-chamber defines a predetermined volume and the ratio of the orifice diameters to the pre-chamber volume is in a range between 0.048 l/cm$^2$ to 0.067 l/cm$^2$.

3. The ignition system as set forth in claim 1 wherein said pre-chamber nozzle defines a longitudinal axis, said orifices disposed about said longitudinal axis in spaced relation with respect to each other.

4. An internal combustion engine comprising:
    an engine block including at least one cylinder, a piston supported for repeated reciprocal movement in said cylinder, and a cylinder head;
    said piston, cylinder and cylinder head cooperating to define at least one combustion chamber;
    said cylinder head including at least one intake port through which the main fuel air charge may flow into said combustion chamber and at least one exhaust port through which the products of combustion may exit said combustion chamber;
    said internal combustion engine further including an ignition system, said ignition system including a housing operatively supported in the cylinder head of the internal combustion engine, said housing defining a pre-chamber;
    an ignition device supported in said housing and having an igniter portion that substantially faces said pre-chamber;
    an injector supported in said housing and having a nozzle that substantially faces said pre-chamber;
    said pre-chamber defining a proximal portion and a pre-chamber nozzle disposed spaced from said proximal portion of said pre-chamber, said pre-chamber nozzle including a plurality of orifices having a diameter in a range between 0.7 mm to 2.0 mm and disposed spaced from one another and providing fluid communication between said pre-chamber and the combustion chamber;
    said igniter portion of said ignition device and said nozzle of said injector operatively supported in the proximal portion of the pre-chamber such that said injector delivers a predetermined quantity of fuel into said pre-chamber, said igniter portion ignites the fuel in said pre-chamber such that the ignited fuel is forced through said orifices of said pre-chamber nozzle and extinguished, but dispersed through the combustion chamber so as to ignite the main fuel charge therein.

5. The internal combustion engine as set forth in claim 4 wherein said pre-chamber defines a predetermined volume and the ratio of the orifice diameters to the pre-chamber volume is in a range between 0.048 l/cm$^2$ to 0.067 l/cm$^2$.

6. The internal combustion engine as set forth in claim 4 wherein said pre-chamber nozzle defines a longitudinal axis, said orifices disposed about said longitudinal axis in spaced relation with respect to each other.

* * * * *